(12) United States Patent
Webb et al.

(10) Patent No.: US 7,648,179 B2
(45) Date of Patent: Jan. 19, 2010

(54) CONNECTOR HAVING OFFSET RADIUS GROOVES

(75) Inventors: Earl D. Webb, Wilson, OK (US); Robert Pipkin, Marlow, OK (US); Muhammad Asif Ehtesham, Duncan, OK (US); Robert Howard, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 521 days.

(21) Appl. No.: 11/623,788

(22) Filed: Jan. 17, 2007

(65) Prior Publication Data

US 2008/0169650 A1 Jul. 17, 2008

(51) Int. Cl.
*F16L 37/24* (2006.01)

(52) U.S. Cl. ............... 285/397; 285/382; 166/242.6

(58) Field of Classification Search ............... 464/18, 464/179, 180, 181, 182, 183, 905, 906; 403/282, 403/287, 12, 274; 29/505, 508, 515; 166/242.2, 166/242.6, 77.1, 384; 285/91, 259, 330, 285/382, 382.1, 382.4, 382.7, 404, 239, 242, 285/256, 397; 175/320–326, 340
See application file for complete search history.

(56) References Cited

U.S. PATENT DOCUMENTS

| | | | | |
|---|---|---|---|---|
| 170,377 | A | * | 11/1875 | Johnson ............ 285/382 |
| 1,817,772 | A | * | 8/1931 | Sipe ............ 174/84 R |
| 2,715,008 | A | * | 8/1955 | Huber ............ 410/103 |
| 4,184,871 | A | | 1/1980 | Oba et al. ............ 430/70 |
| 4,836,586 | A | * | 6/1989 | Martin ............ 285/381.3 |

(Continued)

FOREIGN PATENT DOCUMENTS

EP 1460236 3/2004

(Continued)

OTHER PUBLICATIONS

SPE 94163 Large-Diameter Coiled Tubing Becomes Available Safely Offshore Through a Newly Developed Spoolable Connector: Case Histories and Field Implementation; L. Link, SPE, and L. Laun, SPE, BJ Services A/S; K.T. Nesvik, SPE, Statoil ASA; and H. Boge, SPE, ConocoPhillips Norway; SPE/CoTa Coiled Tubing Conference and Exhibition, Apr. 12-13, The Woodlands, Texas; Copyright 2005, Society of Petroleum Engineers, 2005.

SPE 35590 Lessons Learned on Coiled Tubing Completions, Stephens, R.K., Loveland, K.R., BP Exploration (Alaska) Inc.; Witlow, R.R., Melvan, J.J., Orbis Engineering; SPE Gas Technology Symposium, Apr. 28-May 1, Calgary, Alberta, Canada; Copyright 1996, Society of Petroleum Engineers, Inc., 1996.

(Continued)

*Primary Examiner*—Victor MacArthur
*Assistant Examiner*—Jay R Ripley
(74) *Attorney, Agent, or Firm*—John W. Wustenberg; Baker Botts, LLP

(57) ABSTRACT

A connector which joins two opposing sections of coil tubing or coil tubing to coil tubing tools so as to enable torque applied from one section to be transmitted to the other section is provided. The connector employs varying width and depth grooves into which portions of the sections of coil tubing are deformed so as to create the torque transmitting connection between the connector and sections of coil tubing. Each of the grooves have a narrow width portion and a wide width portion and corresponding shallow depth and deep depth portion. The narrow width portion of one of the grooves is approximately 180° out of phase from the narrow width portion of the other varying width groove.

18 Claims, 5 Drawing Sheets

U.S. PATENT DOCUMENTS

| | | | |
|---|---|---|---|
| 5,238,273 A | 8/1993 | Laflin et al. | 285/119 |
| 5,248,151 A | 9/1993 | Pickup | 473/585 |
| 5,251,695 A | 10/1993 | Coronado | 166/242.6 |
| 5,285,851 A | 2/1994 | Pringle | 166/326 |
| 5,306,050 A | 4/1994 | Laflin et al. | 285/119 |
| 5,411,085 A | 5/1995 | Moore et al. | 166/242.2 |
| 5,515,880 A | 5/1996 | Pringle | 137/155 |
| 5,667,252 A * | 9/1997 | Schafer et al. | 285/15 |
| 6,192,983 B1 | 2/2001 | Neuroth et al. | 166/250.15 |
| 6,367,557 B1 | 4/2002 | Rosine et al. | 166/384 |
| 6,474,701 B1 | 11/2002 | Bowles et al. | 285/382.1 |
| 6,561,278 B2 | 5/2003 | Restarick et al. | 166/378 |
| D476,731 S | 7/2003 | Cise et al. | D24/110 |
| 6,712,150 B1 | 3/2004 | Misselbrook et al. | 166/384 |
| 6,715,925 B2 * | 4/2004 | Pairone et al. | 384/536 |
| 6,890,007 B1 | 5/2005 | Parker | 285/354 |
| 7,059,881 B2 | 6/2006 | Song et al. | 439/191 |
| 2003/0226667 A1 | 12/2003 | Hill | 166/384 |
| 2004/0184871 A1 | 9/2004 | Luft et al. | 403/300 |
| 2005/0248151 A1* | 11/2005 | Connell | 285/286.2 |
| 2006/0243453 A1 | 11/2006 | McKee | 166/380 |
| 2007/0000669 A1 | 1/2007 | McKee et al. | 166/380 |
| 2007/0235198 A1 | 10/2007 | Parker | |
| 2008/0169094 A1* | 7/2008 | Ehtesham et al. | 166/77.2 |

FOREIGN PATENT DOCUMENTS

| | | |
|---|---|---|
| GB | 2314391 | 1/1997 |
| GB | 2340574 | 4/1997 |
| GB | 2369634 | 11/2001 |
| WO | WO97/41377 | 4/1997 |

OTHER PUBLICATIONS

SPE 89527 Development of a New Spoolable Mechanical Coiled Tubing Connector, H.B. Luft, L.E. Laun, P.B. Thov, BJ Services Company Canada; SPE/CoTA Coiled Tubing Conference and Exhibition, Mar. 23-24, Houston, Texas; Copyright 2004, Society of Petroleum Engineers, 2004.

SPE 46053 Applications Update—Advanced Composite Coiled Tubing, Fowler, S.H., Fiberspar Spoolable Products, Inc.; Feechan, M., Berning, S.A., Halliburton Energy Services, Inc.; SPE/CoTA Coiled Tubing Roundtable, Mar. 15-16, Houston Texas; Copyright 1998, Society of Petroleum Engineers, 1998.

SPE 40031 Composite Coiled Tubing in Harsh Completion/Workover Environments, Rispler, K., Berning, S., Halliburton Energy Services, Inc; Fowler, H. Fiberspar Spoolable Products, Inc.; SPE Gas Technology Symposium, Mar. 15-18, Calgary, Alberta, Canada; Copyright 1998, Society of Petroleum Engineers Inc., 1998.

SPE 26538 A Spoolable Coiled-Tubing Gas-Lift Completion System, Walker, E.J., Hendrix, J.L., Humphrey, K.J., BP Exploration (Alaska) Inc.; Moore, B.K., Nowcam Services Inc.; Whitlow, R.R., Orbis Engineering Inc.; SPE Annual Technical Conference and Exhibition, Oct. 3-6, Houston, Texas; Copyright 1993, Society of Petroleum Engineers, Inc., 1993.

SPE 94159 World's First Utilization of Coiled Tubing to Dissolve Hydrate(s) in an FPSO Riser; Case History, M. Ovesen, SPE, and L. Laun, SPE, BJ Services A/S, and H. Varhaug, SPE, and K.T. Nesvik, SPE, Statoil ASA; SPE/CoTA Coiled Tubing Cofnerence and Exhibition, Apr. 12-13, The Woodlands, Texas; Copyright 2005, Society of Petroleum Engineers, 2005.

SPE 54316 First Diverless Subsea Wireline Well Intervention Performed in Offshore Vietnam Offers Low-Cost Solution for Light Well Workovers: Case Histories and Future Trends, David Larimore, SPE; Halliburton Energy Services, Inc., Charles Ashwell, Brown & Root Energy Services; Abdul Halim Zainal Abidin, Petronas Carigali (Vietnam) SDN BHD; SPE Asia Pacific Oil and Gas Conference and Exhibition, Apr. 20-22, Jakarta, Indonesia; Copyright 1999, Society of Petroleum Engineers, 1999.

SPE 89335 Tapered OD Coiled Tubing System, Mark Kalman, Bob Domann, Randy Rosine, Halliburton; Rodney Stephens, Michael Chambers, BP; John Martin, Quality Tubing; David McWhorter, Texas Oil Tools; SPE/ICoTA Coiled Tubing Conference and Exhibition, Mar. 23-24, Houston, Texas; Copyright 2004, Society of Petroleum Engineers, 2004.

SPE 60734 Composite Coiled Tubing Solution, Terry R. Wheaton, Scott A. Berning, Dick Headrick, Mike Feechan, Clint Isenrock, Halliburton Energy Services, Inc.; Stewart H. Fowler, Fiberspar, Inc. Spoolable Products; SPE/ICoTA Coiled Tubing Roundtable, Apr. 5-6, Houston, Texas; Copyright 2000, Society of Petroleum Engineers Inc., 2000.

SPE 60730 Development of a Power and Data Transmission Thermoplastic Composite Coiled Tubing for Electric Drilling, G.P. Kamp, Airborne Development; M. Betts, SPE, Shell International Exploration and Production B.V.; SPE/ICoTA Coiled Tubing Roundtable, Apr. 5-6, Houston, Texas; Copyright 2000, Society of Petroleum Engineers, 2000.

SPE 89600 New Technologies Allow Small Coiled Tubing to Complete the Work Formerly Reserved for Large Coiled Tubing Units, Lance Portman, BJ Services; SPE/ICoTA Coiled Tubing Conference and Exhibition, Mar. 23-24, Houston, Texas; Copyright 2004, Society of Petroleum Engineers, 2004.

SPE 54507 Applications Engineering for Composite Coiled Tubing, D.W. McClatchie, BJ Services Co.; H.A. Reynolds, T.J. Walsh, C. Lundberg, Hydril Co.; SPE/ICoTA Coiled Tubing Roundtable, May 25-26, Houston, Texas; Copyright 1999, Society of Petroleum Engineers Inc., 1999.

SPE 29781 Coiled Tubing Completions; An Economic Discussion of Procedures, Courville, Perry W., Clark, Thomas R., Halliburton Energy Services; Middle East Oil Show, Mar. 11-14, Bahrain; Copyright 1995, Society of Petroleum Engineers, Inc., 1995.

SPE 89348 Coiled Tubing and Wireline Intervention for Well Abandonment, S. Kirby, BP; G. Skelly, Team Energy; D. Gordon, S. Sheed, Weatherford Wellserv; SPE/ICoTA Coiled Tubing Conference and Exhibition, Mar. 23-24, Houston, Texas; Copyright 2004, Society of Petroleum Engineers, 2004.

SPE 26086 Emerging Coiled-Tubing Applications at Prudhoe Bay, Alaska, Blount, C.G., Ward, S.L., ARCO Alaska Inc.; Hightower, C.M., ARCO E and P Technology; Walker, E.J., BP Exploration (Alaska) Inc., SPE Western Regional Meeting, May 26-28, Anchorage, Alaska; Copyright 1993, Society of Petroleum Engineers, Inc., 1993.

SPE 71056 Packers Designed for Coiled Tubing Completions, Recompletions, and Stimulation, W. Sid Scott, Petro-Tech Tools, A Division of Schlumberger; SPE Rocky Mountain Petroleum Technology Conference, May 21-23, Keystone, Colorado; Copyright 2001, Society of Petroleum Engineers Inc., 2001.

SPE 29358 Steps Towards a Comprehensive Reeled Tube Drilling System, Faure, A.M., Peter Oosterling, Lord, D.J., Shell Research B.V.; Vuuinghs, Pieter, Petroleum Development Oman; Brinkhorst, Jan, BEB Erdol Erdgas GmBH; SPE/IADC Drilling Conference, Feb. 28-Mar. 2, Amsterdam, Netherlands; Copyright 1995, SPE/IADC Drilling Conference, 1995.

Coiled Tubing Tools Manual "Connectors" dated Aug. 2004.

http://www.oilonline.com/news/features/oe/20041001.The_reel. 16032.asp—describes BJ Services Spoolable Connector (Duralink) Efforts with the Misselbrook spin, Oct. 1, 2004.

http://www.spe.no/bergen/doc/one_day_seminar_04/pdf_disc/troldtog/ 8% 20 Developement %20 of % 20a%20new%20spoolable%20mechanical%20CT%20connector.pdf—BJ Presentation in Norway on Duralink, Apr. 20, 2004.

http://www.iadc.org/dcpi/dc-julaug05/July05-coiled.pdf. , Another article titled "Coiled tubing technical advances cut operational costs sharply" on BJ's Duralink, Drilling Contractor, pp. 36-41, Jul./Aug. 2005.

http://www.slb.com/media/services/coiled/tools/ezspliceconnector.pdf—Schlumberger's EZ Splice Connector, CoilTOOLS Catalog.

http://www.ctes.com/Services/custom/Generic%20Detailed%20CT%20Manual%20TOC.pdf—CTES Manual Index on the web—see Chapter 5—connectors, Index Only.

\* cited by examiner

CONNECTOR HAVING OFFSET RADIUS GROOVES

FIELD OF THE INVENTION

The present invention relates generally to connectors for coil tubing and more specifically to a connector, which grips adjacent tubing sections so as to allow torque to be transmitted between such tubing sections.

BACKGROUND

Coil tubing is primarily used to perform various down hole operations in oil and gas wells. The depth of the well can be many thousands of feet which makes the continuous coil tubing reel very heavy and in some situations impossible to move in one piece. In offshore rigs, the weight of the coil tubing reel is limited by crane capability and other logistical issues related to the harsh working environment, which requires the coil tubing to be transported in two or three reels. Conventional methods of joining coil tubing requires a certified welder to weld two ends of coil tubing together without significantly de-rating the fatigue limit of the coil tubing, which is in the range of 30-40% for a manual butt weld. However, certified welders are very expensive and not always readily available. The equipment needed to insure a high integrity weld is also expensive and not always readily available.

There are several coil tubing connectors on the market which have attempted to address some of these issues. A dimple connector is one example of such a connector. It uses a dimpling method to join two ends of the coil tubing to a central connector. The center of the connector is formed with radial slots filled with elastomeric pieces. The dimple connector has an acceptable fatigue life and exhibits a good tensile strength; however, the elastomeric material is not suitable in all fluid environments. Furthermore, this design requires a hydraulic dimpling tool on location.

A simple roll-on type connector has also been proposed. However, such connectors do not have a good torque rating and hence are not practical for joining two ends or sections of coil tubing. Other connectors, such as slip connectors and splined connectors, are not spoolable and therefore are also not practical for joining spoolable coil tubing.

Therefore, there is a need in the coil tubing industry for a connector which has good tensile and fatigue strength, can be spooled easily on a reel, requires minimal equipment to install, and has good torque imparting characteristics.

SUMMARY

In one embodiment, the present invention is directed to a connector which joins two sections of coil tubing. The connector is defined by a generally cylindrical main body having a mid-section and opposing ends. The connector is further defined by a first pair of varying width and depth grooves formed in the mid-section of the main body adjacent to one of opposing ends of the main body and a second pair of varying width and depth grooves formed in the mid-section of the main body adjacent to the other opposing end of the main body. Each of the varying width and depth grooves in the first and second pairs of varying width and depth grooves has a narrow width and depth portion and a wide width and depth portion. The depth is shallow at the narrow portion of the groove and deep at the wide width portion of the groove.

In one embodiment, the narrow width portion of one of the varying width and depth grooves from the first pair of varying width and depth grooves is approximately 180° out of phase from the narrow width portion of the other varying width and depth groove from the first pair of varying width and depth grooves. Similarly, the narrow width portion of one of the varying width and depth grooves from the second pair of varying width and depth grooves is approximately 180° out of phase from the narrow width portion of the other varying width and depth groove from the second pair of varying width and depth grooves. Likewise, the wide width portion of one of varying width and depth grooves from the first pair of varying width and depth grooves is approximately 180° out of phase from the wide width portion of the other varying width and depth groove from the first pair of varying width and depth grooves and the wide width portion of one of the varying width and depth grooves from the second pair of varying width and depth grooves is approximately 180° out of phase from the wide width portion of the other varying width and depth groove from the second pair of varying width and depth grooves. In one embodiment, each of the grooves diverges from the narrow width portion to the wide width portion at an approximate angle of 3° also resulting in change of depth of grooves from 0.156 inches to 0.096 inches.

BRIEF DESCRIPTION OF THE DRAWINGS

The following drawings form part of the present specification and are included to further demonstrate certain aspects of the present invention. The present invention may be better understood by reference to one or more of these drawings in combination with the description of embodiments presented herein. However, the present invention is not intended to be limited by the drawings.

DETAILED DESCRIPTION

Figure 1:
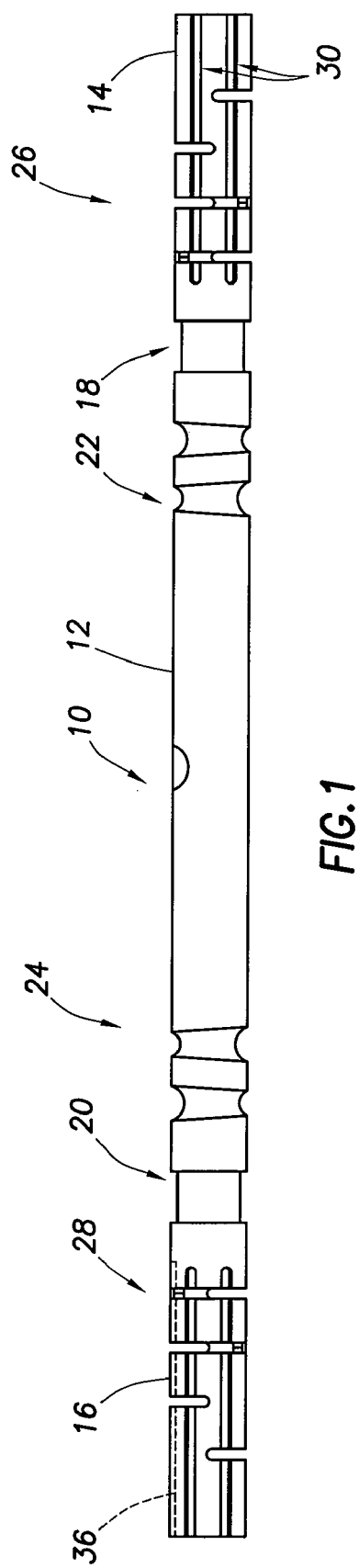
FIG. 1 is a schematic diagram illustrating the connector according to the present invention.

The present invention will now be described with reference to the following exemplary embodiments. Referring now to FIG. 1, a spoolable connector is shown generally by reference number 10. The spoolable connector connects two sections of a coil tubing (not shown). The spoolable connector 10 is generally cylindrical in shape and formed of a metal alloy such as AISI-SAE 4130 Modified, but as those of ordinary skill in the art will appreciate other suitable metals or materials may be used to form the spoolable connector so as to give it its desired tensile and fatigue strength yet make it ductile enough to bend. The spoolable connector 10 is defined by a main body having a mid-section 12 and opposing ends 14 and

16. The spoolable connector 10 further includes a pair of circular grooves 18 and 20 formed in the mid-section 12 of the main body.

One of the circular grooves 18 is disposed adjacent to opposing end 14 of the main body and the other circular groove 20 is disposed adjacent to opposing end 16 of the main body. A generally circular or ring-shaped seal (not shown) fits within the circular groove 18 in use (i.e., when the connector is installed). The seal prevents fluids from flowing into or out of the corresponding section of coil tubing. A second generally circular or ring-shaped seal fits within the circular groove 20 in use and also performs the function of sealing the respective corresponding section of coil tubing to the connector thereby preventing fluid from flowing into or out of the coil tubing. The seals, generally circular (e.g., O-ring shaped), V-ring shaped, molded on or bonded and machined may be formed of rubber, elastomer, a soft metal, or other suitable material with or without backups formed of metal, plastic or any combination of these, which prevents fluids from flowing into and out of sections of the coil tubing. The circular grooves 18 and 20 are machined into the main body of the spoolable connector 10 using conventional machining techniques. As those of ordinary skill in the art will appreciate more or less seals and corresponding grooves may be provided depending upon the application and environment. For example, one, two or more circular grooves may be provided of differing width and depth on each end 14, 16 of the connector 10.

The spoolable connector 10 further comprises opposing sets of varying width and depth grooves 22 and 24 formed at opposing ends of the mid-section. 12 of the main body. In one exemplary embodiment, one of the opposing sets of varying width and depth grooves 22 is disposed adjacent to the circular groove 18. The other opposing set of varying width and depth grooves 24 is disposed adjacent the other circular groove 20. Each of these grooves extends approximately 360° around the circumference of the main body and are off-plane from an adjacent groove.

Figure 3:
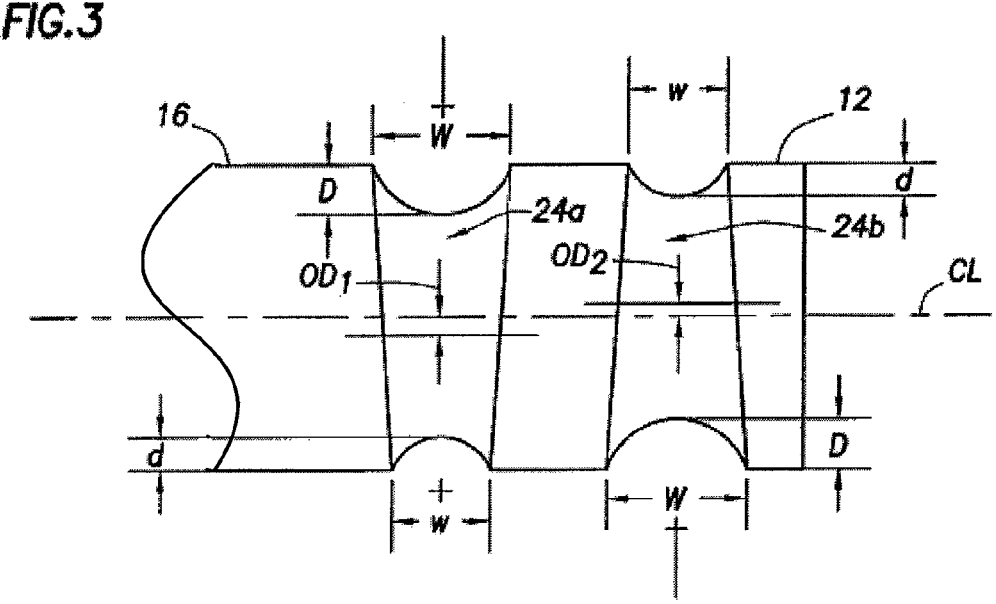
FIG. 3 is an enlarged view of the varying width and depth grooves of the connector shown in FIGS. 1 and 2.
Figure 4:
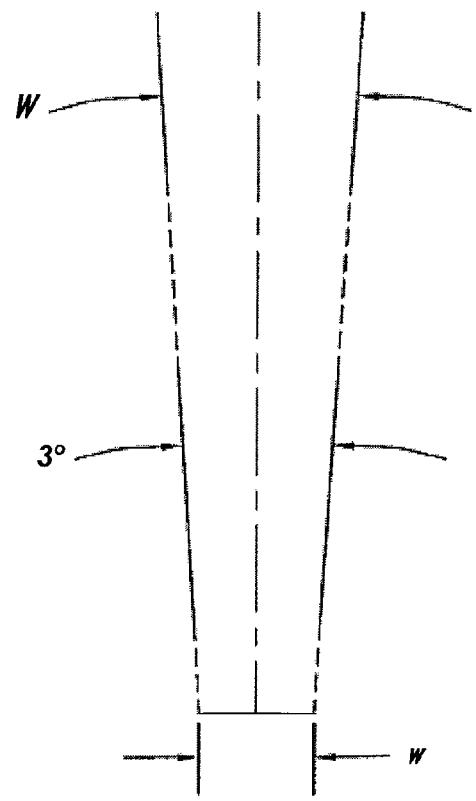
FIG. 4 is a diagram illustrating the taper of the varying width and depth grooves.

Each of the grooves has a varying width and depth. The width varies from a minimum distance w (narrow width) to a maximum distance W (wide width), which is 180° apart from the minimum distance. In one embodiment, the minimum distance w is approximately 0.375 inches and the maximum distance W is approximately 0.445 inches, as illustrated in FIG. 3. In one embodiment, the taper of the groove between the distance w and the distance W is approximately 3°, as illustrated in FIG. 4. The depth varies from a minimum depth d at a narrow width portion w to a maximum depth D at wider width portion W. In one embodiment, the minimum depth d is 0.096 inches and the maximum depth D is 0.156 inches.

As shown in FIG. 3, the center of the groove nearest the end 16 (groove 24a) is offset a distance $OD_1$ from the centerline CL of the connector 10 and the center of the groove nearest the mid-section 12 (groove 24b) is offset a distance $OD_2$ from the centerline CL. The offset distance $OD_1$ is shown below the centerline CL in FIG. 3 and the offset distance $OD_2$ is shown above the centerline CL. Accordingly, the distance between the centerline of the groove 24a and centerline of the cylindrical body ($OD_1$) is approximately 0.018 inches. The distance between the centerline of the groove 24b and the centerline of the cylindrical body ($OD_2$) is approximately 0.03 inches. Alternatively, the offset distance $OD_1$ and $OD_2$ can be the same. Thus, the grooves 24a and 24b have offset radii and varying width and depth.

In one exemplary embodiment, the distance between the varying width and depth grooves 22 and 24 nearest the mid-section 12 from each other is 4 inches or greater. Distances of 4 inches or greater enable greater bending of the spoolable connector 19 around the spool. As those of ordinary skill in the art will appreciate, the number, length, width, depth and exact orientation of the varying width and depth grooves may be varied.

In one exemplary embodiment, the pair of opposing sets of varying width and depth grooves 22 and 24 mate with crimped sections of the opposing sections of coil tubing. A crimping tool known in the art is used to deform the coil tubing into the sets of partial grooves 22 and 24. A crimpling tool is a C-shaped pipe cutting tool with the cutting wheel replaced with a roller indenter. The roller indenter has dimensions matching the groove dimensions on the connector.

Figure 6B:
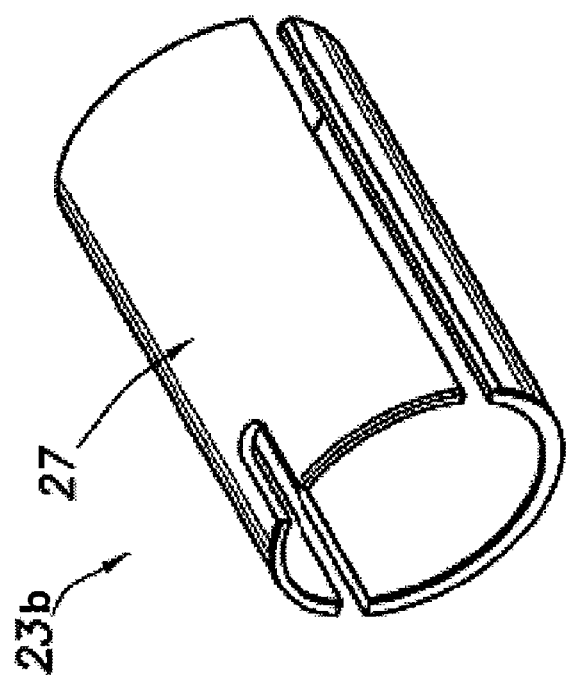
FIGS. 6A and 6B are schematic diagrams of two sections of an off-center clamp used to crimp the varying width and depth grooves.
Figure 6A:
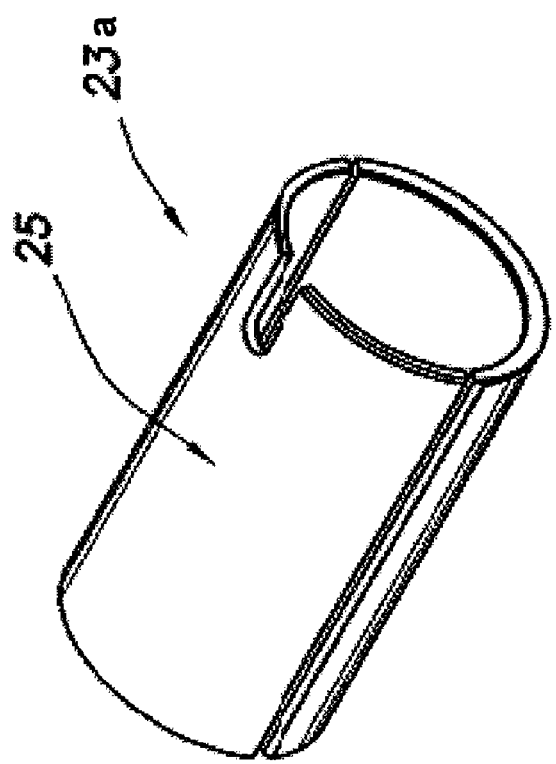
Figure 8:
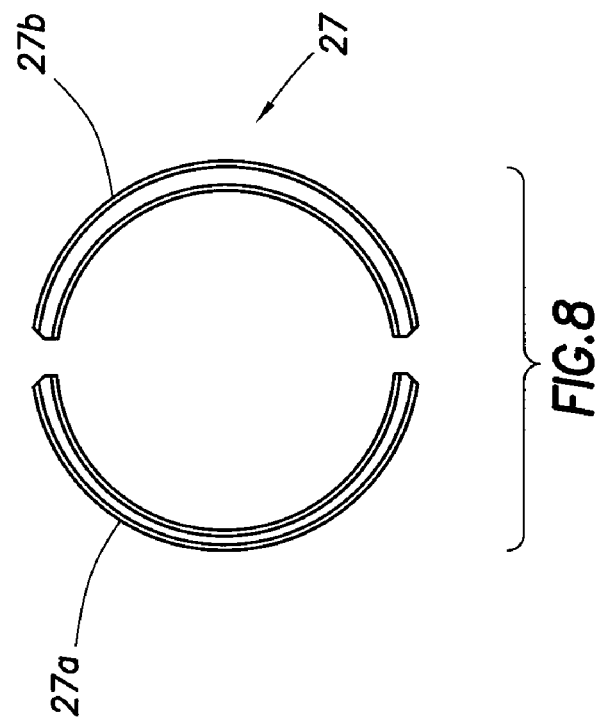
FIG. 8 is an axial view of two halves of the section of the off-center clamp shown in FIG. 6B.
Figure 7:
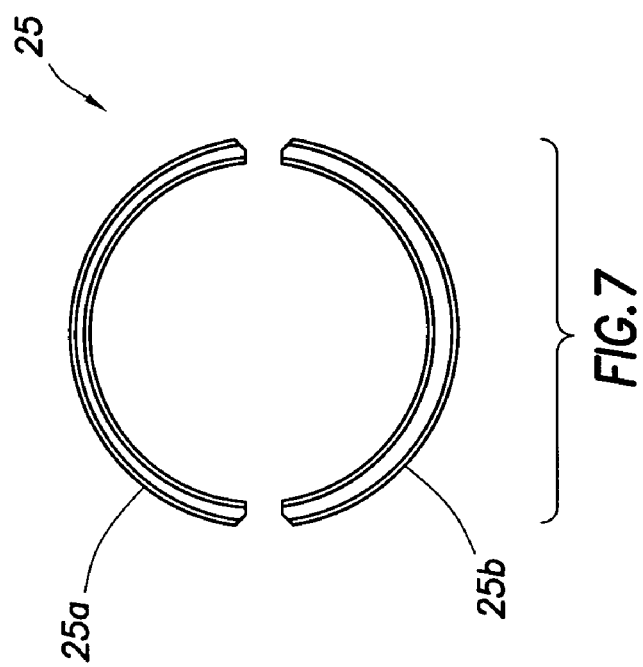
FIG. 7 is an axial view of two halves of the section of the off-center clamp shown in FIG. 6A.

An installation clamp 23a, 23b as shown in FIGS. 6A and 6B is used to crimp the corresponding sections of coil tubing on to the varying width and depth grooves 22 and 24. The installation clamp 23a, 23b is placed over the coil tubing (which is positioned over the connector) at the corresponding location on the connector where the varying width and depth grooves 22 and 24 are to be formed. The installation clamp 23a, 23b consists of two sections 25 and 27 with each section further divided in two halves 25a and 25b, and 27a and 27b, respectively, axial views of which are shown in FIGS. 7 and 8, respectively. The centerline of installation clamp 23a, 23b is off center by distance $OD_2$. The purpose of two sections is to allow the roller indenter to be able to crimp the coil tubing. The purpose of two halves are ease of assembly. The crimping tool is then placed over the installation clamp with the indenter portion between the gap of two sections 25 and 27 of installation clamp. This allows the roller indenter to push sections of coil tubing onto the varying width and depth grooves.

Since the installation clamp 23 is off-center by the off-center distance of varying width and depth grooves 22 and 24, the crimping tool rotates eccentrically on the coil tubing resulting in lesser penetration at the thick portion of installation clamp 25 and deeper penetration at the thin portion of installation clamp. This results in a narrow width and shallow depth at the thin portion of the installation clamp position on the coil tubing and a wider width and deeper depth at the thick portion of the installation clamp position on the coil tubing. The crimping tool has a screw-type feed mechanism, which presses the sections of coil tubing to the desired depth as the roller indenter is pushed against it.

Because the grooves are of varying width and depth they lock with the coil tubing and hence the sections of coil tubing do not rotate relative to the spoolable connector thereby enabling the spoolable connector 10 to effectively transmit torque between the two opposing sections of coil tubing. The varying width of the groove acts as a wedge so as to grip the opposing sections of coil tubing rotationally, thereby enabling the connector to effectively transmit torque between the opposing sections of coil tubing. The varying depth compresses the portions of coil tubing harder on the connector thereby preventing any rotation. The varying width and depth grooves 22 and 24 are machined into the main body of the spoolable connector 10 using conventional machining techniques.

Figure 2:
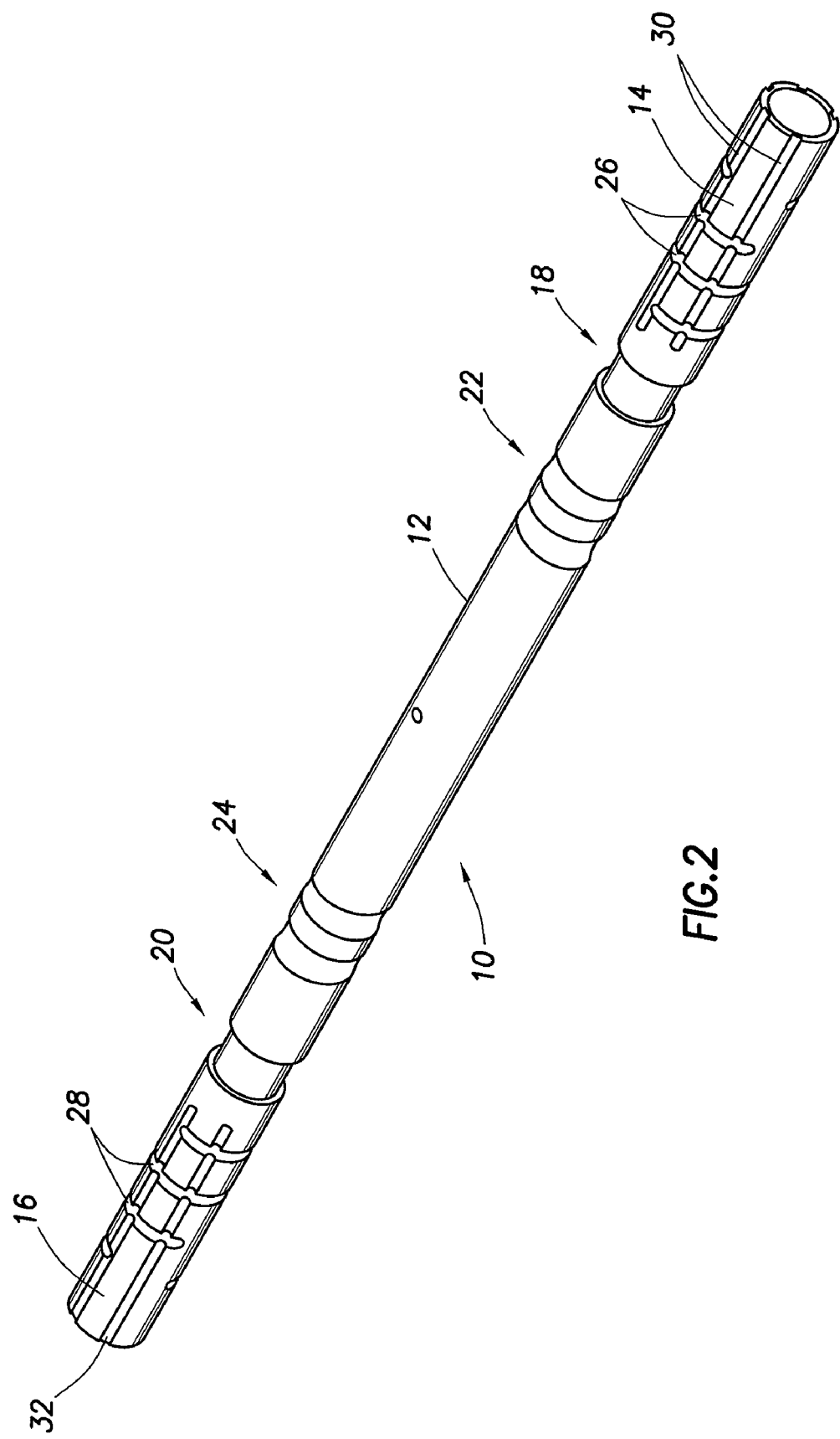
FIG. 2 is a perspective view of the spoolable connector shown in FIG. 1.

The spoolable connector 10 further has a plurality of radial slots 26 and 28 disposed on each of the opposing ends 14 and 16, respectively. Each of the plurality of radial slots 26 and 28 extends partially around the circumference of the main body of the spoolable connector 10. In one embodiment, each of the opposing ends 14 and 16 has four radial slots each of which extends approximately 270° around the circumference of the main body and is 90° out of phase from an adjacent radial slot. FIG. 2 shows a perspective view of the spoolable connector 10 illustrating the opposing pairs of circular grooves 18 and 20, the opposing sets of offset grooves 22 and 24 and the opposing radial slots 26 and 28.

Each of the opposing ends 14 and 16 further include a plurality of longitudinal grooves 30 and 32 formed along each of said opposing ends. In one embodiment according to the present invention, each of the opposing ends 14 and 16 has multiple longitudinal grooves formed there along equally spaced from one another around the circumference of the main body. In one exemplary embodiment, six equally-spaced longitudinal grooves 30 and 32 are provided. The longitudinal grooves 30 and 32 accommodate the weld seam typically found on the inside surface of the opposing sections of coil tubing. It saves the time and expense of having to remove the weld seam, which is difficult especially for distances greater than six inches. Although only one such seam exists, having multiple longitudinal grooves provides for ease of installation of the opposing sections of coil tubing over the spoolable connector 10 with minimal axial misalignment and therefore decreases the amount of torsional preload applied to the spoolable connector 10. The longitudinal grooves 30 and 32 are machined into the opposing ends of the spoolable connector 10 using conventional machine techniques.

Figure 5:
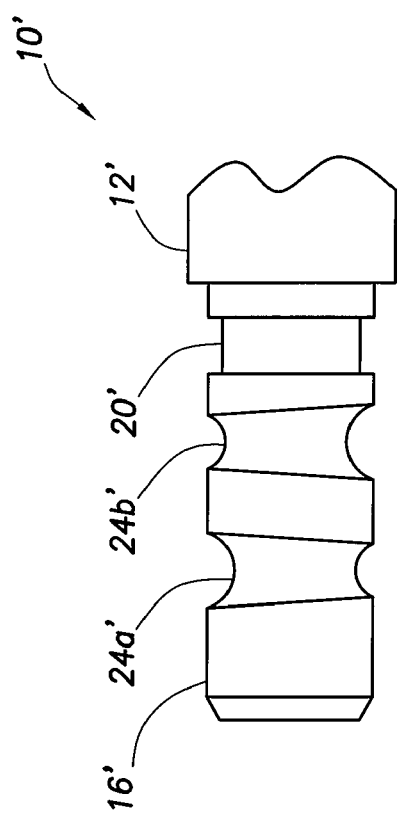
FIG. 5 is a schematic diagram of an end of another type of connector having the varying width and depth grooves in accordance with the present invention.

Referring now to FIG. 5, an alternate connector utilizing the varying width and depth grooves of the present invention is shown. This embodiment places the circular groove 20' for the seal between the varying width and depth grooves 24a' and 24b' and the mid-section 12' rather than placing it between the varying width and depth grooves and the end 16'. This connector also does not have a plurality of radial slots 28 or plurality of longitudinal grooves. As those of ordinary skill in the art will appreciate, the varying width and depth grooves of the present invention have applicability in other types of connectors, i.e., those not necessarily dedicated to joining two ends of coil tubing.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A connector configured to join two sections of coil tubing, comprising:
    a generally cylindrical main body having a mid-section and opposing ends;
    at least one pair of varying width circular grooves formed in the mid-section of the main body adjacent to one of opposing ends of the main body; and
    at least one pair of varying width circular grooves formed in the mid-section of the main body adjacent to the other opposing end of the main body;
    wherein each varying width groove is formed in one or more exterior surfaces of the mid-section, and wherein each varying width circular groove comprises:
    a varying outermost width that diverges from a narrow portion to a wide portion;
    a shallow depth portion;
    a deep depth portion that is deeper than said shallow depth portion and that comprises a bottom most portion, wherein the bottom most portion is angularly offset about a centerline of said connector relative to another of said bottom most portions of an adjacent one of said varying width grooves; and
    wherein each of said varying width grooves defines a center of curvature that is offset from said centerline of said connector.

2. The connector according to claim 1, wherein the narrow width portion of the varying width grooves is approximately 0.375 inches wide and the wide width portion of the grooves is approximately 0.445 inches wide.

3. The connector according to claim 1, wherein the shallow depth portion of the varying width grooves is approximately 0.096 inches deep and the deep depth portion of the grooves is approximately 0.156 inches deep.

4. The connector according to claim 1, wherein a centerline of one varying width groove in each of the pairs of said grooves is offset by approximately 0.018 inches from a centerline of the main body of the connector and a centerline of the other varying width groove in each of the pairs of said grooves is offset by approximately 0.03 inches from the centerline of the main body in another direction and wherein the centerlines of adjacent grooves are approximately 0.048 inches apart from each other.

5. The connector according to claim 1, wherein the narrow width portion of one of each of the pairs of varying width offset grooves is approximately 180° out of phase from the narrow width portion of the other of each of the pairs of varying width grooves.

6. The connector according to claim 5, wherein the wide width portion of each of the varying width grooves is approximately 180° out of phase from the wide width portion of its adjacent groove.

7. The connector according to claim 1, wherein each of the grooves diverge from the narrow width portion to the wide width portion at an approximate angle of 3°.

8. The connector according to claim 1, where a circular groove is provided proximate each of the opposing ends of the main body which in use is fitted with a generally ring or tubular-shaped seal.

9. The connector according to claim 8, wherein one of the circular grooves is disposed between one of the at least one varying width grooves and one of the opposing ends of the main body and the other circular groove is disposed between the other of the at least one varying width grooves and the other opposing end of the main body.

10. The connector according to claim 1, wherein each of the opposing ends has a plurality of radial slots, each of which extends partially around the circumference of the main body.

11. The connector according to claim 10, wherein each of the opposing ends has four radial slots, each of which extends approximately 270° around the circumference of the main body and is 90° out of phase from an adjacent radial slot.

12. The connector according to claim 1, wherein each of the opposing ends has a plurality of longitudinal grooves formed there along equally spaced around the circumference of the main body.

13. The connector according to claim 12, wherein each of the opposing ends has six longitudinal grooves formed there along equally spaced from one another around the circumference of the main body.

14. A connector, comprising:
    a generally cylindrical main body having a mid-section and at least one end; and a pair of varying width circular grooves formed in the mid-section of the main body adjacent to the at least one end;

wherein each varying width circular groove is formed in the exterior surface of the mid-section and has a varying outermost width;

wherein the connector is configured to allow fluid passage through the main body;

wherein the varying width of each of the varying width circular grooves diverges from a narrow portion to a wide portion;

wherein each of the varying width circular grooves has a shallow depth portion and a deep depth portion that is deeper than said shallow depth portion;

said deep depth portion of one of said pair of varying width circular grooves is angularly offset about a centerline of said connector relative to the deep depth portion of the other of said pair of varying width circular grooves; and wherein each of said varying width circular grooves defines a center of curvature that is offset from said centerline of said connector.

15. The connector according to claim 14, wherein the width of the narrow portion is approximately 0.375 inches and the width of the wide portion is approximately 0.445 inches.

16. The connector according to claim 14, wherein each of the grooves diverge from the narrow width portion to the wide width portion at an approximate angle of 3.

17. The connector according to claim 14, wherein a centerline of one of the grooves is offset by approximately 0.018 inches from a centerline of the main body of the connector and a centerline of the other groove is offset by approximately 0.03 inches from the centerline of the main body of the connector and wherein the centerlines of the respective grooves are offset by approximately 0.0418 inches from each other.

18. The connector according to claim 14, wherein the shallow depth portion of the varying width grooves is approximately 0.096 inches deep and the deep depth portion of the grooves is approximately 0.156 inches deep.

* * * * *

UNITED STATES PATENT AND TRADEMARK OFFICE
CERTIFICATE OF CORRECTION

PATENT NO. : 7,648,179 B2  Page 1 of 1
APPLICATION NO. : 11/623788
DATED : January 19, 2010
INVENTOR(S) : Webb et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 523 days.

Signed and Sealed this

Sixteenth Day of November, 2010

David J. Kappos
*Director of the United States Patent and Trademark Office*